Aug. 28, 1945.  S. B. MARTIN  2,383,508
COLLET
Filed July 10, 1942
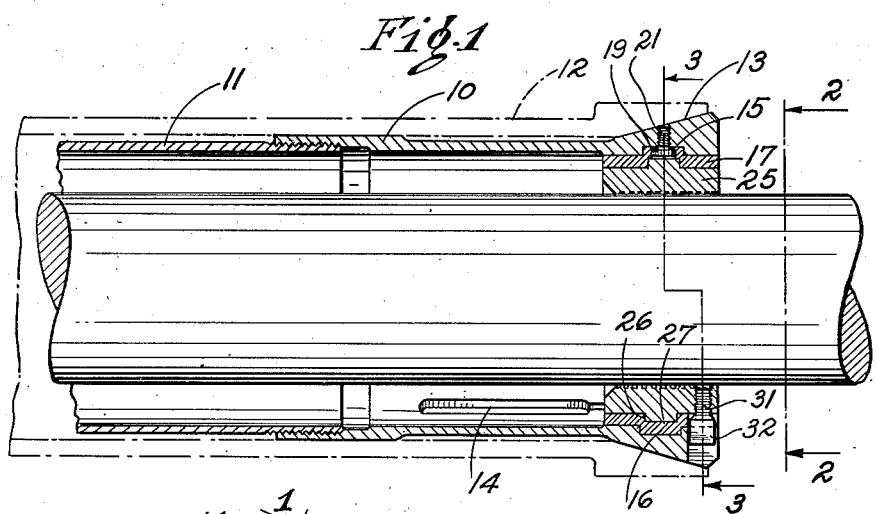
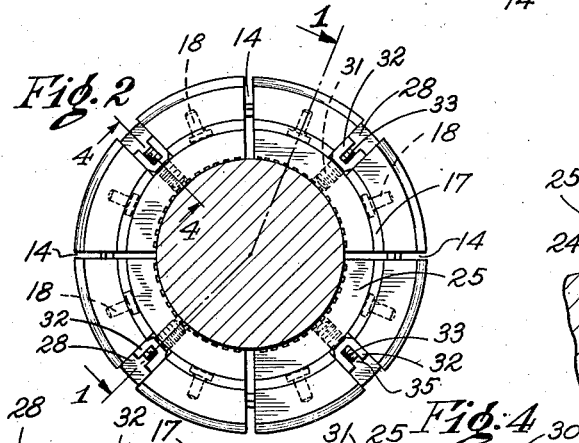
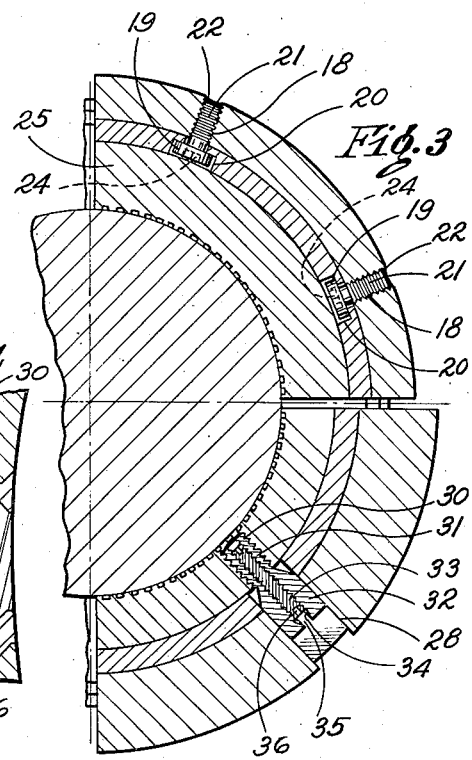
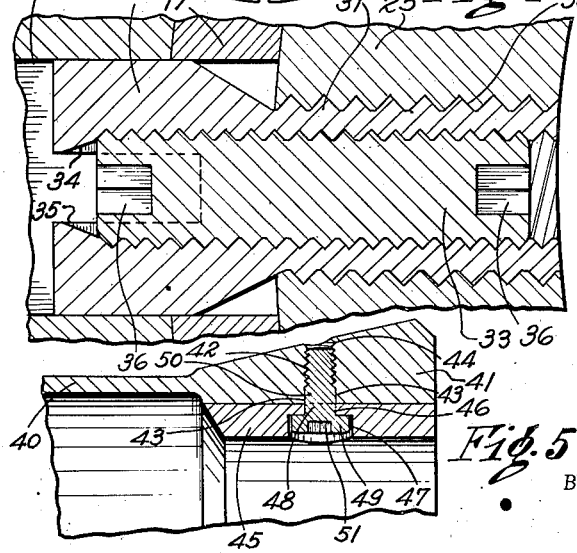
INVENTOR.
STODDARD B. MARTIN
BY Richey & Watts
ATTORNEYS Patented Aug. 28, 1945

2,383,508

UNITED STATES PATENT OFFICE 2,383,508

COLLET

Stoddard B. Martin, Lakewood, Ohio

Application July 10, 1942, Serial No. 450,431

6 Claims. (Cl. 279—51)

This invention relates to collets for automatic screw machines and the like and more particularly to an improved master collet.

Automatic screw machines and the like are ordinarily provided with a collet tube within a rotatable spindle, the collet being provided with separate spring fingers having work engaging surfaces which are arranged to be forced inwardly to grip the bar of stock and compel the same to rotate with the spindle, and to be released to permit a new length of stock to be advanced into position to be operated upon. In such collets, and in similar devices for gripping stock, it is desirable to form the work-engaging surfaces on removable pads so that the collet may be readily adapted to handling stock of different diameters. Such devices, however, are of but limited utility unless the pads are suitably secured in place by some means permitting the removal and replacement of the pads without disassembling the collet or other gripping element from its position within the spindle or other part of the machine. Devices for accomplishing this purpose are disclosed and claimed in my Patents No. 2,155,019, issued April 18, 1939; No. 2,291,397, issued July 28, 1942; and No. 2,291,398, issued July 28, 1942.

The principal objects of this invention are to simplify and reduce the cost of pads and fastening means for master collets and the like while retaining accessibility for removal and replacement of the pads; to reduce the number of different sizes of pads required for a plurality of machines of different sizes by combining pads and adapters so that each set or series of pads may be used on collets of various sizes; and to provide improved arrangements of fastening means for securing pads and adapters in position while permitting their removal and replacement without dis-assembling the collet from the spindle within which it is mounted. Other objects will appear from the following description of preferred embodiments of the invention.

In the accompanying drawing:

Fig. 1 is a longitudinal section through a collet taken on the line 1—1 of Fig. 2 illustrating the improved fastening means; the spindle being shown in broken lines;

Fig. 2 is a section through the stock on the line 2—2 of Fig. 1 showing the face of the collet in elevation;

Fig. 3 is a partial section on an enlarged scale on the line 3—3 of Fig. 1;

Fig. 4 is an enlarged detail section on the line 4—4 of Fig. 2; and

Fig. 5 is a partial longitudinal section on an enlarged scale through a collet showing an alternative arrangement for fastening either pads or adapters to the collet body.

Referring to Figs. 1 to 4 of the drawing, the numeral 10 designates a collet which may be screwed or otherwise fastened to the end of a collet tube 11. The collet and collet tube when in operative position in the machine are normally disposed within the rotatable spindle 12 indicated by broken lines in Fig. 1. The collet is formed near its forward face with a tapering wedging surface 13 arranged to cooperate with a corresponding surface on the spindle so that when the collet tube is drawn rearwardly the collet is wedged inwardly on the stock. To permit this action the collet 10 is formed with a plurality of slots 14 extending inwardly from its front face and dividing the collet body into a plurality of resilient fingers.

In the arrangement illustrated in Figs. 1 to 3 the interior surface of the collet adjacent its forward face is formed with a circumferential groove 15 arranged to receive a complementary rib 16 formed on an adapter 17. As shown, the collet is provided with four splits 14 forming four segmental fingers to each of which is fitted a segmental adapter 17. The adapters 17 are secured in position by bolts 18 having heads 19 seated in counter bores 20 in the adapters and having shanks 21 threaded into radial holes 22 formed in the segments of the collet body. The heads 19 of the bolts are preferably formed with hexagonal sockets 24 so that they may be manipulated by a wrench or driver inserted through the stock opening in the collet from the front face thereof without dis-assembling the collet from its position in the spindle.

A plurality of pads 25 are provided, one for each of the segments of the collet body. Preferably the adapters 17 are formed with circumferential recesses 26 which receive complementary ribs 27 formed on the exterior surfaces of the pads. A relatively shallow slot 28 is formed in the front face of each of the segments of the collet 10 and extends through the forward edge of each of the adapters 17. Each pad 25 is provided with a radially extending threaded hole 30 into which is screwed a stud 31. Integrally formed with the stud 31 is a post 32, preferably square in cross section, adapted to fit closely within one of the slots 28 in the front face of the collet. The stud 31 and post 32 are drilled longitudinally throughout their length and threaded internally to receive an expanding nut 33. At the outer end of the post 32 the internal opening is tapered inwardly as indicated at 34 so that when the nut 33 is screwed outwardly in the post it engages the tapered portions 34 and expands the end of the post into gripping engagement with the walls of the slot 28. The post is split longitudinally by slots 35 to permit such expansion. The nut 33 is provided at either one or both ends with a socket 36, preferably hexagonal, to receive a wrench to manipulate the nut. When a socket 36 is provided at each end of the nut, the nut may be manipulated by an angled wrench inserted into either the inner end of the stud 31 or the outer end of the post 32 from the front face of the collet. When a nut is provided with a socket at only one end it is arranged to be inserted into the stud 31 with either end of the nut foremost so that the nut may be manipulated from either end as desired.

With the collet arranged in its normal position within the spindle of the machine the adapters 17 may first be inserted from the front face of the collet through the stock opening therein and fastened in place by the bolts 18, these being manipulated by an angled wrench inserted from the front face of the collet. Thereupon the desired sized pads 25 may also be inserted from the front face of the collet with the posts 32 fitting in the slots 28 formed in the front faces of the collet segments and in the adapters. Each of the pads is then firmly secured in position by turning the nut 33 radially outward against the tapered portions 34 so as to expand the post 32 laterally into engagement with the side walls of the slot 28.

By the use of the adapters 17 a single set or series of pads may be used on two or more machines of different sizes so that each small sized pad may be used on all larger machines, it being necessary to have different sets of pads only for the sizes of stock between the maximum size of the small machine and the maximum size of the larger machine. The adapters are preferably made of ordinary unhardened material, whereas the pads are preferably hardened to increase their life. Thus the adapters may be manufactured much more cheaply than the pads and a substantial economy is effected in a plant having machines of various sizes.

The collets 10 are also preferably constructed of high-grade steel and are hardened and spring tempered so as to provide the desired resiliency in the separate segments of the collet and also to minimize wear on the wedging surfaces 13. The studs 31 and posts 32, on the other hand, are relatively soft unhardened steel, while the nuts 33 are preferably hardened. Thus the threads on the nut 33 retain their original contour while the cooperating threads in the studs 31 and posts 32 may yield and conform to the threads on the nut.

By making the nuts and posts with the longitudinally extending openings receiving the nuts 33, each stud may be substantially completed on an automatic screw machine without the necessity of cross boring and tapping an opening after the stud has been completed as in the case of the fastening studs disclosed and claimed in my Patent No. 2,291,398. Thus the cost of the fastening elements for the pads is substantially reduced.

A modified arrangement is illustrated in Fig. 5. In this embodiment the collet 40 is provided with a plurality of resilient segments 41 as in the embodiment previously described. Each segment 41 is formed with a radially extending opening 42 spaced rearwardly a short distance from the front face of the collet and preferably disposed at about the center of the segment circumferentially. In the preferred arrangement, as illustrated, the opening 42 is provided with a smooth counterbore 43 adjacent its inner surface, and is threaded, as indicated at 44, through the remainder of its length.

A pad 45 is provided for each of the segments 41. As shown, the inner surfaces of the segments and the outer surfaces of the pads are smooth cylindrical segments, without interfitting ribs and the like. Each pad is provided with a radial hole 46 having an enlarged counterbore 47 on its inner surface. A bolt 48 extends through the hole 46 and into the threaded hole 44 in the segment. The bolt is formed with a head 49 seating in the counterbore 47, and a shank 50 closely fitting the hole 46 in the pad and the counterbore 43 in the collet segment. Preferably the bolt head is formed with a socket 51 so that it may be manipulated by an angled wrench inserted from the front face of the collet.

The pads 45 and bolts 48 are inserted into the collet from the front face and the bolts tightened into place. The cylindrical curvature of the collets and pads prevents rotation of the pads about the axes of the bolts while axial and circumferential thrusts on the pads are taken by the bolt shanks 50.

This embodiment provides a simple, cheap and effective arrangement for securing either adapters or pads to the finger of the collets and the like, which is particularly useful for the larger sizes of collets. The heads of the bolts are readily accessible from the front face of the collet, eliminating any necessity for disassembling the collet tube to change or replace pads. The centrifugal force resulting from the rotation of the collet tube tends to throw the bolts radially outward, so that they tend to tighten rather than loosen during operation of the machine.

Although two embodiments of my invention have been disclosed in considerable detail, it will be understood that various modification and rearrangements of the parts may be resorted to without departing from the scope of the invention as defined in the following claims.

I claim:

1. A master collet comprising a hollow body having a plurality of resilient fingers terminating in a front face, said fingers being formed with a circumferential groove on the inner surfaces thereof spaced from the front face, an adapter fitting the interior surface of each of said fingers, each of said adapters having a circumferential rib on its exterior surface fitting within the circumferential groove on said fingers and said adapters having a circumferential groove on their interior surfaces, bolts extending through said adapters and threaded into said fingers, a pad having a work engaging inner surface fitting against the interior surface of each of said adapters, each of said pads having a circumferential rib on its exterior surface fitting within the circumferential groove in said adapters, and means securing each of said pads to its finger and adapter, said means being accessible from the front face of the collet for manipulation to secure or release the pad, said fingers being adapted to receive other pads having a greater radius of curvature on their exterior surfaces in place of said adapters, whereby a single series of pads with different sized work engaging surfaces may be applied to collets of different sizes.

2. A master collet comprising a hollow body having a plurality of resilient fingers terminating in a front face, said fingers being formed on their inner surfaces with a circumferential groove, an adapter having a circumferential rib on its exterior surface and circumferential groove on its interior surface fitting the interior surface of each of said fingers, means securing each of said adapters to its respective finger, each of said fingers having an opening extending inwardly from its front face and communicating with the interior of said body, each of said adapters having a recess extending inwardly from its front face and aligned with the opening in its finger, a pad having a work engaging inner surface and a circumferential rib on its outer surface fitting against the interior surface of each of said adapters, each of said pads having a laterally expansible post extending outwardly therefrom through the recess in one of said adapters and into the opening in one of said fingers and means accessible from the front face of said collet for expanding each of said posts into gripping engagement with the walls of its opening, said fingers being adapted to receive similar pads having a greater radius of curvature on their exterior surfaces in place of said adapters, whereby a single series of pads having different sizes of work engaging surfaces may be installed selectively on collets of different sizes.

3. A master collet comprising a hollow body having slots extending into the same from the front face thereof providing a plurality of resilient segments, each of said segments having an opening extending inwardly from its front face, a pad fitting against the inner surface of each of said segments, means for securing each of said pads to its segment comprising an axially split, radially expansible post carried by each of said pads and fitting within the opening of its segment, each of said posts being formed with an axially extending tapped opening having wedging surfaces, and a member screw threaded into the opening of said post and accessible for manipulation from an end thereof, said member being engageable with said wedging surfaces and movable axially of said post to expand the same into gripping engagement with the walls of one of said openings.

4. A master collet comprising a hollow body having slots extending into the same forming a plurality of resilient segments, each of said segments having a parallel walled opening extending inwardly from its front face and communicating with the interior of the body, a pad fitting against the inner surface of each of said segments, each of said pads carrying a post formed with an axially extending tapped opening having wedging surfaces, said post having flat sides engaging the walls of the opening in one said segments, and a member screw threaded into the opening of said post accessible for manipulation from an end of said post, the outer end of said post being split and said member being movable axially outward in said post to engage said wedging surfaces and expand the post against the walls of said opening.

5. A master collet comprising a hollow body having slots extending into the same from the front face thereof providing a plurality of resilient segments, each of said segments having an opening extending inwardly from its front face, a pad fitting against the inner surface of each of said segments, means for securing each of said pads to its segment comprising a radially expansible post carried by each of said pads and fitting closely within the opening of its segment, each of said posts being formed with an axially extending tapped opening having wedging surfaces, and a member screw threaded into the opening of said post and accessible for manipulation from an end thereof, said member being movable axially of said post into engagement with said wedging surfaces to expand the post radially into gripping engagement with the walls of its segment opening.

6. A master collet comprising a hollow body having slots extending into the same from the front face thereof providing a plurality of resilient segments, each of said segments having an opening extending inwardly from its front face, a pad fitting against the inner surface of each of said segments, means for securing each of said pads to its segment comprising a radially expansible post carried by each of said pads and closely fitting within the opening of its segment, said post having an axially extending opening therethrough including a tapered portion, and a member screw threaded into the opening of said post and accessible for manipulation from either end of said post, said member being movable axially of said post into engagement with the tapered portion to expand the post radially into gripping engagement with the walls of its segment opening.

STODDARD B. MARTIN.